Patented Sept. 13, 1955

2,717,907

United States Patent Office

2,717,907
PREPARATION OF 2,4,5-TRICHLOROPHENOXY ACETIC ACID

Edward F. Orwoll, Medina, N. Y., assignor to Food Machinery and Chemical Corporation, San Jose, Calif.

No Drawing. Application November 12, 1952,
Serial No. 320,137

2 Claims. (Cl. 260—521)

The present invention relates to a novel procedure for preparing 2,4,5-trichlorophenoxy acetic acid.

In the chlorination of phenol, extreme difficulty is encountered in controlling the amount of chlorine entered as a substituent and also difficulty is encountered in controlling the position to which the chlorine enters the benzene ring.

It is an object of the present invention to control the position and number of molecules entering a benzene ring which already contains a phenolic group.

In accordance with the present invention, the phenolic group of 2,5-dichlorophenol is first protected by transforming the phenol to an ether by reaction of 2,5-dichlorophenol with monochloracetic acid with the production of 2,5-dichlorophenoxy acetic acid.

This step is readily performed by the reaction of 2,5-dichlorophenol sodium salt with monochloracetic acid sodium salt, i. e. heating the phenol and acid together in alkaline aqueous solution. The reaction proceeds readily in aqueous medium at a temperature in the neighborhood of 100° C. The resultant sodium salt of 2,5-dichlorophenoxy acetic acid, being relatively insoluble in water, is readily recovered by simple filtration or other convenient separation procedure in yields of better than 80%.

The 2,5-dichlorophenoxy acetic acid sodium salt is then suspended in water to prepare a slurry thereof and the suspension treated with the stoichiometric amount of gaseous chlorine which is passed through the slurry. The reaction proceeds rapidly and efficiently even at room temperature with the production of 2,4,5-trichlorophenoxy acetic acid. The pH of the slurry remains relatively constant and near the neutral point as the liberated hydrochloric acid reacts with the sodium salt producing the free acid and sodium chloride. The course of the reaction is readily observable as the pH remains relatively constant and begins to fall just prior to the completion of the chlorination. The insoluble free 2,4,5-trichlorophenoxy acetic acid may be filtered off or separated by other conventional means. It is sufficiently pure to be used as an herbicide without additional purification as the melting point of the acid so prepared is from 148° to 152° C.

The following example is given merely as illustrative of the principles of the invention and is not given by way of limitation.

Example 61 parts by weight (0.25 mol) of the sodium salt of 2,5-dichlorophenoxy acetic acid is suspended in 350 parts by weight of water. The slurry is stirred during the introduction of 18 parts by weight (0.25 mol) of gaseous chlorine. The pH of the slurry becomes slightly acidic after the addition of about ½ the chlorine. The slurry is stirred for two hours after the addition of chlorine is completed. The slurry is then heated to 95° C., filtered and washed with water. The residue after drying at 100° C. is a pale yellow solid weighing 57 parts by weight. Melting point 148 to 152° C. This compares with a melting point of 153° C. for 2,4,5-trichlorophenoxy acetic acid.

The chlorine content of the resulting compound was determined and found to be 41.8% as compared with a theoretical content of 41.6% for 2,4,5-trichlorophenoxy acetic acid.

It will be seen that the present invention provides a simple efficient method for the production of the wanted 2,4,5-T which is a known herbicide of excellent herbicidal activity.

What is claimed is:

1. The method of producing 2,4,5-trichlorophenoxy acetic acid from 2,5-dichlorophenol which comprises first heating 2,5-dichlorophenol and monochloracetic acid in the presence of caustic alkali to produce the sodium salt of 2,5-dichlorophenoxy acetic acid, and reacting a molar quantity of the latter with a molar quantity of chlorine by passing the calculated quantity of chlorine gas through an aqueous suspension of said salt.

2. In the method of producing 2,4,5-trichlorophenoxy acetic acid, the step comprising passing the calculated quantity of chlorine gas into an aqueous suspension of the sodium salt of 2,5-dichlorophenoxy acetic acid to change the latter to 2,4,5-trichlorophenoxy acetic acid.

References Cited in the file of this patent

UNITED STATES PATENTS

| | | |
|---|---|---|
| 2,471,575 | Manske | May 31, 1949 |
| 2,598,692 | Henrich | June 3, 1952 |

OTHER REFERENCES

Groves et al.: J. Chem. Soc. (London), vol. 1929 (p. 517).
Pokorny: J. Am. Chem. Soc., vol. 63, p. 1768 (1941).
Ennis et al.: Chem. Abstracts, vol. 40, col. 6197 (1946).
Haskelberg: J. Org. Chem. (London), vol. 1947, pp. 426–33.